United States Patent [19]

Dillon et al.

[11] Patent Number: 5,663,661

[45] Date of Patent: Sep. 2, 1997

[54] MODULAR BUS WITH SINGLE OR DOUBLE PARALLEL TERMINATION

[75] Inventors: John B. Dillon, Palo Alto; Srinivas Nimmagadda, Santa Clara; Alfredo Moncayo, Redwood City, all of Calif.

[73] Assignee: Rambus, Inc., Mountain View, Calif.

[21] Appl. No.: 680,589

[22] Filed: Jul. 12, 1996

Related U.S. Application Data

[63] Continuation of Ser. No. 416,326, Apr. 4, 1995, Pat. No. 5,578,948.

[51] Int. Cl.$^6$ .......................... H03K 17/16; H03K 19/003
[52] U.S. Cl. .................................... 326/30; 327/292
[58] Field of Search ........................ 326/30; 327/292; 375/257

[56] References Cited

U.S. PATENT DOCUMENTS

| 4,987,318 | 1/1991 | Burke et al. | 326/30 |
| 5,003,467 | 3/1991 | Donaldson et al. | 326/30 |
| 5,046,072 | 9/1991 | Shimizu et al. | 326/30 |
| 5,434,516 | 7/1995 | Kosco | 326/30 |

OTHER PUBLICATIONS

"Adaptive Control of Off–Chip Drivers", *IBM Technical Disclosure Bulletin*, vol. 33, No. 7, Dec. 1990, pp. 267–268.
Taguchi, Masao, "High–Speed, Small–Amplitude I / O Interface Circuits for Memory Bus Application", *IEICE Transactions on Electronics*, vol. E77–C, No. 12, Dec. 1994, pp. 1944 –1950.
Patent Abstracts of Japan, vol. 14, No. 483 (E–0993), 22 Oct. 1990, p. 1 of 1. (JP2198226, Jun. 8, 1990, Atsushi).

Primary Examiner—Edward P. Westin
Assistant Examiner—Richard Roseen
Attorney, Agent, or Firm—Blakely, Sokoloff, Taylor & Zafman, LLP

[57] ABSTRACT

A modular bus permitting single or double termination is described. The bus includes a terminated motherboard data net for communicating data signals between a master and one or more motherboard devices. A socket is used for coupling the data signals between the motherboard data net and a terminated module data net of a removable module. The module data net communicates the data signals between the master and one or more module devices. The data signal swing and level of reflection of the data signals are substantially independent of the presence of the module.

32 Claims, 6 Drawing Sheets

MODULAR BUS WITH SINGLE OR DOUBLE PARALLEL TERMINATION

This is a continuation of application Ser. No. 08/416,326, filed Apr. 4, 1995 now U.S. Pat. No. 5,578,948.

FIELD OF THE INVENTION

This invention relates to the field of bus architectures. In particular this invention relates to a high speed modular bus architecture that converts between single termination without a module and double termination with a module.

BACKGROUND OF THE INVENTION

Computer systems typically include devices or modules that communicate with a processor using a bus. One example of such a module might be a memory module. The bus is essentially a transmission line that carries signals such as clock, data, control, and address signals between the processor, modules, and other bus devices.

The bus architecture must be flexible enough to permit removal or addition of modules. For example, a processor might be located on a motherboard or backplane. Other boards (daughter boards) or modules, such as memory expansion modules, are then plugged into a socket on the motherboard. The socket connects a bus on the module to the motherboard bus when the module is plugged in. Thus the motherboard bus has been extended by the bus on the module. The bus (i.e., the motherboard and module buses collectively) needs to be able to accurately distribute precisely timed signals with or without such modules.

The timing and distribution of signals is often of critical importance in the computer system. However, as with other types of transmission lines, signal reflection may frustrate signal timing and distribution. Signal reflections are created when the bus interfaces with a component that has an impedance which differs from the characteristic impedance of the bus, such as a module. In other words, impedance discontinuities on the bus will generate reflections. Ideally, if the module impedance is matched with the characteristic impedance of the bus, there will be no reflections. However, when the impedances are not matched, the resulting reflections tend to degrade the computer system performance.

In particular, signal reflections can have a detrimental effect on the speed and operation of the computer system. The devices communicating on the bus might have to wait until the reflections have subsided before accepting any signal from the bus as valid. This waiting period tends to slow the system down. Alternatively, if a sufficient waiting period has not elapsed, then signal reflections might be misinterpreted as valid signals resulting in unpredictable operation of the system.

One prior art method of decreasing the effect of reflections requires the use of terminators. A terminator is a dissipative load, typically a resistor, located at the end of a transmission line. The terminator is chosen to have an impedance that matches the characteristic impedance of the transmission line. Prior art termination architectures include series termination and parallel termination.

In series termination, the terminating resistor is placed in series with the device driving the transmission line. In parallel termination, the device drives the transmission line directly and a terminator is placed at one or both ends of the transmission line. A bus with a parallel termination at one end of the bus is referred to as a single parallel termination bus. Alternatively such a bus may be called a singly terminated bus. A bus with parallel terminations at both ends is referred to as a double parallel termination bus. Alternatively such a bus may be called a doubly terminated bus.

In one prior art singly terminated bus, the terminator is replaced with an extended bus segment containing a terminator. The extended bus segment includes the expansion modules. In another prior art singly terminated bus, all expansion sockets on the bus are populated with either a functional module or a "dummy module". The functional module is a module such as a memory expansion module. The dummy module in this case is a module designed to provide the same effective load as a functional module. Thus in either of these cases the bus is always maintained as a singly terminated bus either with or without the modules.

Double parallel termination is commonly used in high speed bus architectures. In one prior art doubly terminated bus architecture, modules are plugged into or removed from a doubly terminated bus. The modules effectively tap into the bus. Bus discontinuities will result whenever a tap does not have a module plugged into it. In some cases the modules are inserted or removed regardless of the impedance mismatch. One disadvantage of this technique is the degradation of system performance as described above. Alternatively, the taps can be populated with dummy modules. One disadvantage of this technique is the complication and cost of additional dummy modules. Thus the bus is effectively maintained as a double parallel termination bus. One disadvantage of such a system is that dummy modules must be available to replace the removed modules.

In one prior art doubly terminated bus, the modules include bus segments that are daisy-chained together as more modules are added to the system. The modules are connected onto a bus already having a terminator. The last module would have to be a dummy module having a second terminator. This architecture always requires a dummy terminator module as the last module in the chain. In addition to the disadvantage of requiring the dummy module, this architecture requires "shuffling" the dummy module to another location every time the number of modules on the bus changes.

SUMMARY AND OBJECTS OF THE INVENTION

In view of limitations of known systems and methods, one of the objectives of the present invention is to provide a modular bus that permits either single or double parallel termination. The bus includes a terminated motherboard data net for communicating data signals between a master and one or more motherboard devices. A socket is used for coupling the data signals between the motherboard data net and a terminated module data net of a removable module. The module data net communicates the data signals between the master and one or more module devices. The data signal swing and level of reflection of the data signals are substantially independent of the presence of the module.

A bus having a clock signal swing substantially independent of the presence of the module is also described. The bus includes a terminated motherboard clock net for communicating a first clock signal to one or more motherboard devices. A clock signal splitter provides the first clock signal and a second clock signal from a source clock signal. A socket communicates at least one of the first clock signal and the second clock signal to a terminated module clock net for one or more module devices.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Single Channel Bus

In one embodiment of a modular single channel bus architecture, a master bus device is coupled to one or more slave bus devices on a motherboard with a bus. A socket on the bus permits a module containing one or more slaves to be coupled to the bus. In order to minimize signal reflections on the bus, four possibilities must be addressed: (1) the module is not plugged in and the master is driving the motherboard slaves; (2) the module is plugged in and the master is driving the motherboard slaves; (3) the module is not plugged in and the motherboard slaves are driving the bus; and (4) the module is plugged in and either the module slaves or the motherboard slaves are driving the bus.

Figure 1:
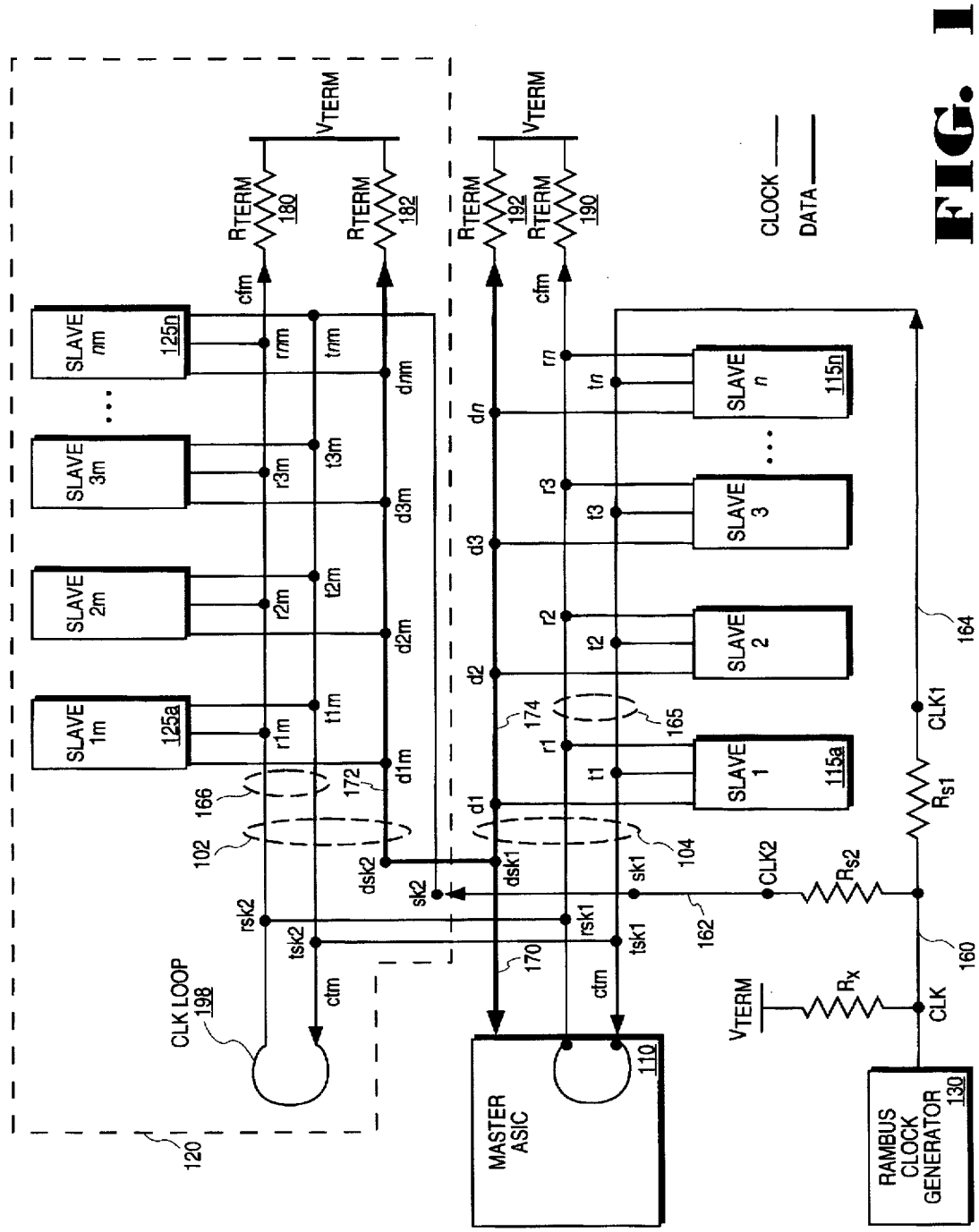
FIG. 1 illustrates the clock and data net topologies for the bus using a single channel master ASIC.

FIG. 1 illustrates the clock and data net topologies for a single channel bus on a motherboard with module 120 plugged in. "Bus" refers collectively to the bus segments coupled to master ASIC 110. In other words, "bus" refers to the motherboard bus and the module bus collectively when the module is plugged in. Without the module "bus" refers only to the motherboard bus. The bus includes module bus 102 and motherboard bus 104. The motherboard bus is a singly terminated bus. The module bus is also terminated. Without the module, the bus is a singly terminated bus. With the module, the bus is a doubly terminated bus. The module bus includes module clock net 166 and module data net 172. The motherboard bus 104 includes motherboard clock net 165 and motherboard data net 174.

In one embodiment, the bus couples a number of slaves (e.g., 115a–115n) on a motherboard and a number of slaves (e.g., 125a–125n) on memory expansion module 120 to master application specific integrated circuit (ASIC) 110. Module bus 102 is coupled to motherboard bus 104 through a socket connector when the module is plugged in to the motherboard. Nodes tsk1, rsk1, sk1, and dsk1 indicate the motherboard socket connections for one embodiment. Nodes tsk2, rsk2, sk2, and dsk2, indicate the corresponding module socket connections.

In one embodiment, the slaves represent dynamic random access memory (DRAMs). Alternatively slaves 115a–115n and 125a–125n may include other types of memory such as static RAMs (SRAMs), video RAMs (VRAMs) or electrically programmable read only memories (EPROMs). In one embodiment, master ASIC 110 is a memory controller. In other embodiments, the master ASIC might be a DMA controller, a graphics controller, a microprocessor, or some other type of intelligent controller.

Clock net 160 is divided into path 164 that drives the motherboard and path 162 that drives the module. Clock generator 130 provides the clock signal for clock net 160. Clock generator 130 could alternatively be part of master ASIC 110. Clock net 160 uses a resistive divider scheme to automatically adjust the clock voltage swing when module 120 is plugged in. In addition, the motherboard and the module have separate terminating resistors for their respective portions of the clock net. Terminating resistor 180 is provided for module 120 and terminating resistor 190 is used by the motherboard. In this embodiment, resistors 180 and 190 have the value $R_{term}$.

The data net for both sets of slaves is illustrated by 170. The motherboard and the module also have separate terminating resistors for their respective portions of the data net. Terminating resistor 182 is provided for module data net 172. Terminating resistor 192 is provided for motherboard data net 174. Terminating resistors 182 and 192 each have the value Rterm. FIG. 1 illustrates one line (i.e., 170) distributed to the motherboard and the module for the data net. In practice, the data net might include a plurality of lines on both the motherboard and the module.

Figure 2:
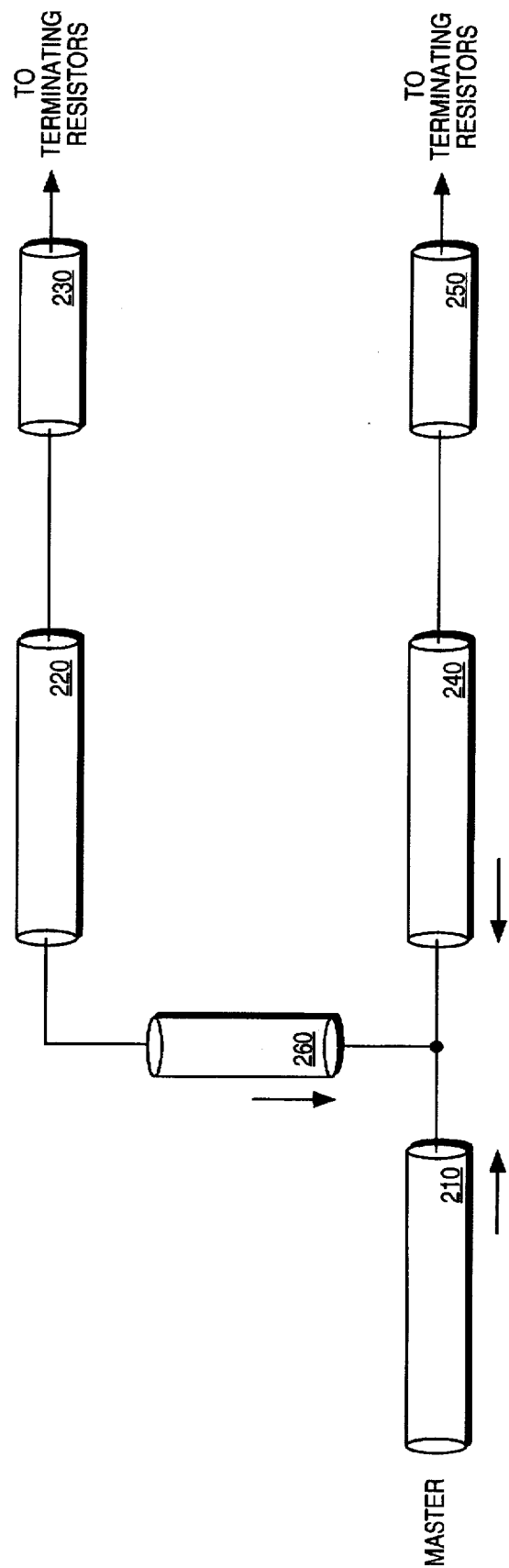
FIG. 2 illustrates the data net modeled as a transmission line.

FIG. 2 illustrates data net 170 modeled as a transmission line. Referring also to FIG. 1, the portion of the motherboard data net from master ASIC 110 to the socket for inserting the module is modeled as stub 210. A stub is a section of transmission line connected to the main transmission line and containing an essentially non-dissipative termination. The motherboard data net includes segment 240 attributable to the motherboard slaves and segment 250 from the last motherboard slave to the motherboard data net terminating resistor (192). The module data net includes segment 220 attributable to the module slaves and segment 230 from the last module slave to the module data net terminating resistor (182). Socket 260 couples the module data net to motherboard data net including stub 210. Terminating resistors 182 and 192 are not shown in this data net model.

First, minimizing the signal reflections for the two cases when the master is driving the bus will be addressed. In this embodiment, the bus (i.e., motherboard bus as extended by the module bus) is designed using controlled impedance transmission lines having a loaded characteristic impedance of 50 ohms. Ideally, when the master is driving the bus there should be no reflections whether the module is present or removed from the system. This requires that stub 210 match the characteristic impedance of the rest of the bus. In the absence of the module, the characteristic impedance of the bus as seen by stub 210 is 50 ohms. However, when module 120 is added to the system, the effect is to place two buses having a characteristic impedance of 50 ohms in parallel. Thus the characteristic impedance seen by stub 210 is 25 ohms when the module is in place.

When the module is removed, stub 210 should be 50 ohms to minimize reflections. When the module is in place, stub 210 should be 25 ohms to minimize reflections. Clearly no single impedance for stub 210 can resolve both cases and therefore there is no single value for stub 210 that will result in zero reflections independently of whether the module is present. An alternative is to choose a value between 25 and 50 ohms that will result in a level of reflection that can be accounted for in both cases. The magnitude of the reflection coefficient, $\Gamma$, can be used as a measure of the relative magnitude of the reflected signals on the data net. $\Gamma$ is a ratio of the reflected signal as compared to the incident signal at a discontinuity along the transmission line or bus. For example a discontinuity will occur at the junction between one transmission line having a characteristic impedance of Z1 feeding another transmission line having a characteristic impedance of Z2 (Z1≠Z2). The symbol ρ will be used to represent the magnitude of Γ (ρ=|Γ|). The magnitude of the reflection coefficient, ρ, can be calculated from the equation $$\frac{|Z_s - Z_o|}{Z_s + Z_o},$$

where $Z_S$ represents the characteristic impedance of the stub and $Z_o$ represents the characteristic impedance of the transmission line.

Minimizing the signal reflections for the cases when the motherboard or module slaves are driving the bus must also be addressed. If the slaves (e.g., 115a, 125a) are driving the bus, stub 210 will act as a capacitance (as long as its electrical length is smaller than the signal transition time). The signal transition time is defined as the length of time required to transition from 20% to 80% of the full signal swing. On buses operating at 200 Mhz and above the signal transition time is typically on the order of 300 picoseconds. The length of time required to transition from peak-to-peak signal swing might be 500 picoseconds. Although there will still be signal reflections, if the stub is essentially a small capacitance the effect of the reflections will be negligible. The stub capacitance, $C_s$, can be expressed as $$C_s = \frac{T_s}{Z_s}.$$

The capacitance can be minimized by decreasing the electrical length, $T_s$, of the stub or by increasing the stub impedance $Z_s$. A conservative rule of thumb for high speed bus design is to keep the stub's electrical length smaller than one-eighth of the signal transition time. Thus, a physical length of 4 mm or less for stub 210 helps to ensure that the stub's electrical length is small enough so that the effect of any reflected signal should be negligible when the slaves are driving the bus whether or not the module is in place.

Determining the impedance of the stub for the cases when the master is driving is now the primary concern because selecting a stub having a relatively short electrical length made the effects of reflections negligible for the cases when the slaves are driving. When the master is driving the bus, the process of choosing a characteristic impedance for stub 210 is a tradeoff between minimizing reflections when the module is plugged in and when the module is removed. As stated above, when the master is driving and the module is not plugged in, the least level of reflections occur when stub 210 is chosen to be 50 ohms. When the master is driving and the module is plugged in, the best value for stub 210 is 25 ohms. Any variation between 25 ohms and 50 ohms will decrease the level of reflection for one case while increasing the level of reflections for the other case. Choosing a value above 50 ohms or below 25 ohms will tend to increase the level of reflections for both cases.

As a compromise, a value between 25 and 50 ohms should be chosen. A value of approximately 35 ohms for the characteristic impedance of stub 210 will ensure that the ρ with the module is about the same as the ρ without the module from the standpoint of the master ASIC. For this embodiment, stub 210 is chosen to have a characteristic impedance of 35 ohms. A 35 ohm stub has the advantages of reasonable physical dimensions (i.e., width and height above ground plane). In one embodiment a value greater than 35 ohms is chosen to decrease the value of $C_s$.

Using a nominal value of approximately 35 ohms for stub 210 results in a ρ of 16.7%

$$16.7\% \left( \left| \frac{35 - 50||50}{35 + 50||50} \right| \right)$$

when the master ASIC is driving the data net and the module is present. The same stub value results in a ρ of about 17.6% when master ASIC is driving the data net without the module. Clearly a characteristic impedance for stub 210 can be chosen so that the level of reflections are even closer to being identical. Thus a level of reflection of the data signals is substantially the same independent of the presence of the module.

The characteristic impedance of the socket should not have any appreciable effect on the above results if the socket's electrical length is small compared to the signal transition time. A socket having an electrical length less than ⅓ of the signal transition time should suffice. Therefore any effects introduced by socket 260 have been neglected from the above calculations.

In one embodiment, the data nets am current mode nets driven by current mode output drivers within master 110 and slaves 115a–115n, and 125a–125n. Even though the output drivers are current mode drivers, the data nets carry low voltage swing signals. These current mode drivers control the voltage levels of the data nets. When a current mode driver is in an "off" state, the respective bus line either stays at or rises to a high voltage level (i.e., $V_{term}$) because the current mode driver will not permit current to flow through the bus line (e.g., 172) from $V_{term}$ to a lower potential. When a current mode driver is in an "on" state, the current mode driver permits a current to flow through the bus line from $V_{term}$ to the lower potential. This has the effect of dropping the voltage on the bus to a low voltage level. The difference between the high and low voltage levels on the bus is the bus signal voltage swing. In one embodiment $V_{term}$ is 2.5 volts and the lower potential is 1.5 volts so that the bus signal voltage swing can be 1 volt.

Typically the current that an output driver can sink is controlled by a reference voltage and a programming resistor. In order to establish the desired voltage swing on the data net for the master ASIC, a resistor of appropriate value is coupled between a current control pin on the ASIC and the supply voltage $V_{term}$. In other words, the amount of current that flows through the current mode driver in the "on" state is controlled by an external resistor coupled to the current control pin.

Figure 3:
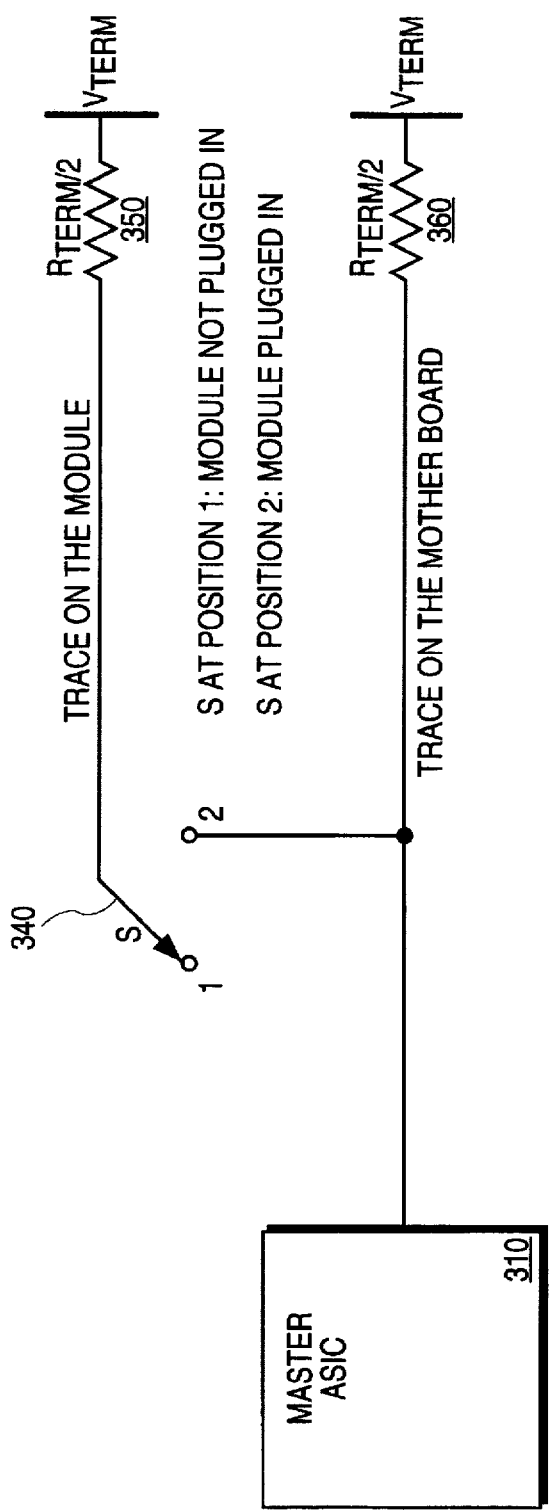
FIG. 3 illustrates current control circuitry for the output drivers of the master ASIC.

FIG. 3 illustrates the current control mechanism for setting the master output signal voltage swing on the data net. Current control resistors 350 and 360 are connected to the current control pin for data net bus line 170. In position 1, switch 340 represents the current control circuit when the module is not in place. In position 2, switch 340 represents the current control circuit when the module is in place. Without the module, the data net signal voltage swing for master ASIC 110 is controlled by current control resistor 360. Referring to FIG. 1, when the module is plugged in the current mode output drivers in master 110 must be able to sink twice as much current as when the module is not plugged in. This will ensure the proper voltage swing on both the motherboard data net and the module data net when the module is plugged in once the proper resistance has been determined for the case when the module is not plugged in.

Prior to insertion of the module, the current for the motherboard data net is adjusted for the master ASIC using resistor 360. When the module is in place, the data net voltage swing is controlled by resistor 360 on the motherboard and resistor 350 on the module. In order to maintain the voltage swing on the both data nets identical, the current control mechanism must ensure that the data net output driver in the master can sink twice the current as when the module was not in place. In one embodiment there is an inverse linear relationship between the current control resistance and the current sunk by the output driver. By choosing 350 and 360 to have the same resistance, the current sunk by the output driver will double when the module is in place. In other words, when the current control resistance is halved by placing 360 in parallel with 350, the amount of current sunk by the output driver doubles because of the inverse linear relationship. This helps to ensure that the motherboard data net and the module data net will have the same voltage swing levels. This tends to ensure data net voltage swing levels are maintained substantially the same with or without the module which in turn helps to maintain signal integrity on the data nets. For one embodiment resistors 350 and 360 have a value of $R_{term}/2$.

The output signal swing on the data nets must also be set for the slaves. In one embodiment, the slaves (e.g., 115a, 125a) use a programmable current control mechanism that depends upon physical detection of the module. A pin on the master ASIC is used to detect the presence of the module. The master programs one value for the slave output drivers if the module is present. The master programs another value for the slave output drivers if the module is not present. This prior art technique however requires at least one pin on each of the master, the socket, and the module for detecting the presence of the module.

Keeping the pin count on the master, the socket, and the module to a minimal level might be a desirable goal. In other words, the pins on the master, the socket, and the module are a finite resource and system constraints might require that the pins be used for functions other than detecting the presence of the module. In one embodiment, the programmable current control mechanism for the slaves does not require a pin on the master for physical detection of the module. Typically the slave output drivers can be adjusted by programming them with different binary values. In the previous example, the slaves were programmed with one of two values depending upon the presence or absence of the module. The slave output drivers, however, typically have a register that can accept a range of binary values. The current is controlled in response to the particular binary value loaded into the register. An appropriate binary value to load into the register could be determined through a calibration process without using a pin on the master to detect the presence or absence of the module.

Figure 4:
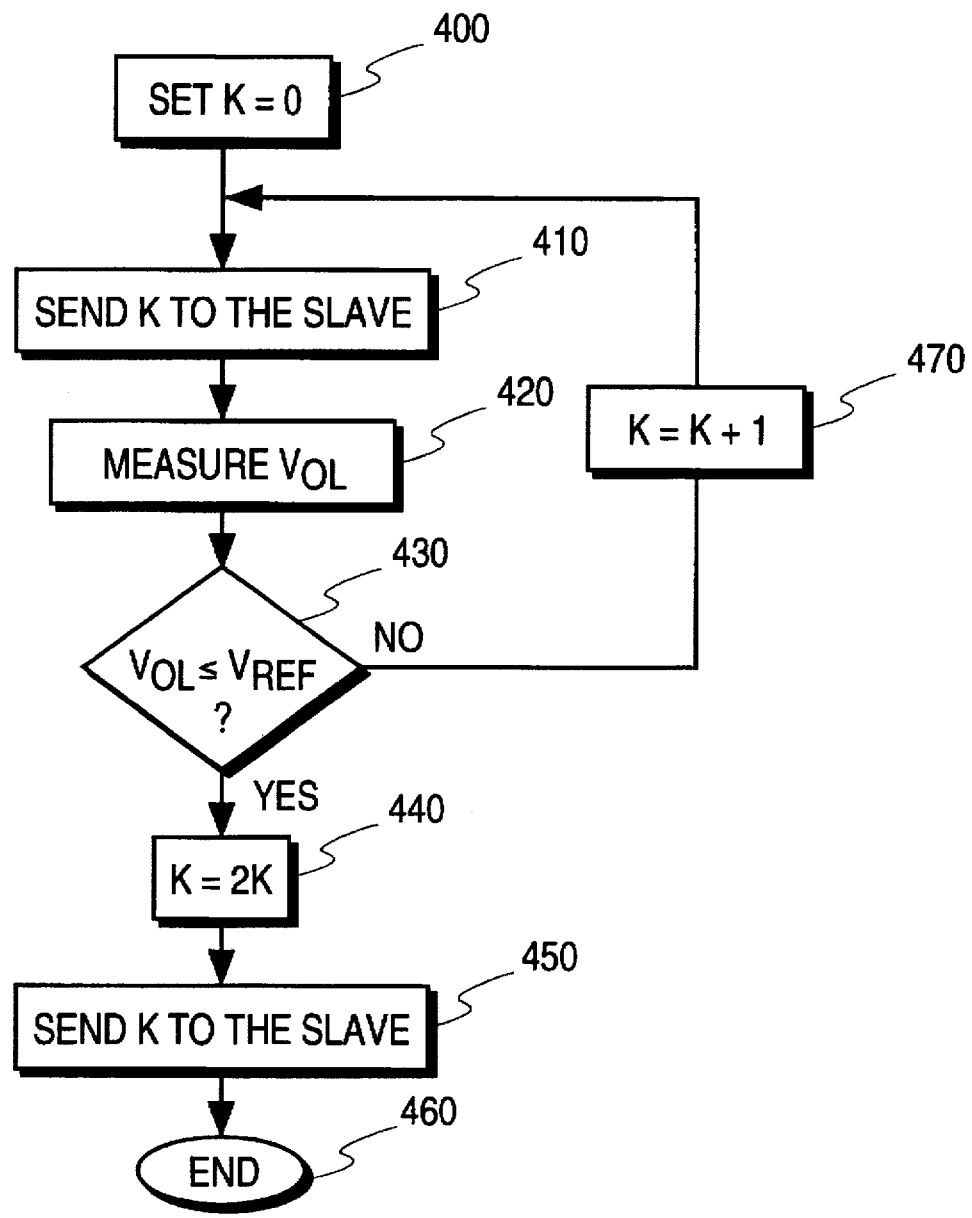
FIG. 4 illustrates an algorithm for programming the current control circuitry for the slaves.

FIG. 4 illustrates a calibration algorithm used in one embodiment for setting the output driver current of slaves having a programmable current control mechanism. The calibration algorithm determines the appropriate value, K, to load into the slave registers. Each time the module is removed or plugged in, the effective impedance changes by a factor of approximately two. The calibration algorithm should be executed any time the module is removed or plugged in. This calibration process helps to compensate for the changed impedance.

The master begins the calibration process at step 400 by setting the initial register setting to zero (K=0). The master communicates with the slaves by sending packets of information. At step 410, the master sends the value K in a packet to a slave that needs calibration. The slave then supplies the K value to an output driver register to induce a current and a low voltage, $V_{OL}$, on a given transmission line of the data net. Next, the slave sends a packet to the master. The master measures the low voltage $V_{OL}$ of the packet at step 420 using input samplers.

At step 430, the master compares the sampled $V_{OL}$ with a reference voltage ($V_{ref}$) to determine if $V_{OL}$ is greater than $V_{ref}$, the binary K value is incremented or decremented to increase the amount of current the driver can sink (and thus lowering $V_{OL}$) at step 470. In this embodiment the amount of current the driver can sink is increased by incrementing the value stored in the output driver register. Thus K is incremented at step 470. The process returns to step 410 and sends the updated register setting to the slave. Otherwise, if $V_{OL}$ is less than or equal to $V_{ref}$, then a final register setting is computed from the present register setting. The final register setting is determined such that the output driver current corresponding to the final register setting will be double the output driver current using the present register setting. In this embodiment, the final register setting is computed by doubling the present register setting at step 440. In an alternative embodiment, the final register setting is computed by halving the present register setting. Doubling the output driver current in this manner helps to provide a symmetric voltage swing around $V_{ref}$. At step 450, the final register setting is sent from the master to the slave and the process ends at step 460.

In one embodiment, K is incremented or decremented in a linear manner as part of the calibration process. For an alternative embodiment, a binary search with respect to K is done as part of the calibration process.

In another embodiment, the initial K value can be set at step 400 to a value that causes the initial $V_{OL}$ voltage to be below $V_{ref}$. For this alternative embodiment, the master compares the sampled $V_{OL}$ at step 430 with the $V_{ref}$ voltage to determine if $V_{OL}$ is greater than or equal to $V_{ref}$. If $V_{OL}$ is not greater than or equal to $V_{ref}$, the K value is decremented or incremented to increase $V_{OL}$ at step 470 and the process repeats from step 410.

In addition to maintaining the signal integrity on the data nets, the bus architecture must ensure signal integrity on the clock nets. Referring to FIG. 1, the clock signal from clock generator 130 is distributed to the slaves and then to the master. The clock signal propagates from generator 130 to master 110 ("ctm" means "clock to master") and from the master to the terminated end of the motherboard clock net ("cfm" means "clock from master"). Labels "ctm" and "cfm" represent the clock signal propagation on the module clock net as it corresponds to the clock signal propagation on the motherboard clock net. In order to minimize skewing between the clock and data signals, the clock net (i.e., motherboard and module clock nets) should have the same electrical characteristics (impedance and electrical length) as the data net between any two devices.

The clock signal can be distributed to the module in one of three ways. In the first embodiment (illustrated in FIG. 1), the module clock net and the motherboard clock net are coupled to each other through the socket by nodes tsk1, tsk2, rsk1, and rsk2. The module clock net includes module clock loop 198. The electrical length of the loop from the socket junction on the module (node tsk2) through clock loop 198 and back to the socket junction (node rsk2) should match the electrical length of the path tsk1-master-rsk1. Module clock loop 198 ensures impedance and timing uniformity as between the module and motherboard clock nets. In this embodiment, the clock signal is provided to the module clock net at a number of locations. Path 162 carries a clock signal through the socket to one end of module clock net 166. Path 164 similarly carries a clock signal to one end of the motherboard clock net 165. The clock signal on motherboard path 165 is communicated to the module clock net at two more locations. The socket connects nodes tsk1 and rsk1 from the motherboard clock net to nodes tsk2 and rsk2, respectively, on the module clock net. Connecting the motherboard and module clock nets in such a manner helps to ensure that the clock signal at a distance d from the master ASIC on one clock net is identical to the clock signal at a distance d from the master on the other clock net at any point in time. This motherboard and module clock net coupling scheme helps to ensure proper timing in the presence of variations in electrical lengths of the transmission lines due to manufacturing tolerances.

A second embodiment of the module clock net does not incorporate the module clock loop. This could be the case if removal of the loop did not cause any appreciable decrease in noise margin. This might be possible when the bus is not experiencing substantial reflections to begin with.

A third embodiment uses only path 162 to carry the clock signal to the module. The module clock loop is present, but there is no connection between the motherboard and module clock nets at nodes tsk1, rsk1, tsk2, and rsk2.

The clock net traces from nodes clk2 to sk1 and from sk1 to tnm should be kept as small as possible. The length of the clock trace from clk1 to tn is adjusted to provide identical clock-to-end electrical lengths for the paths defined by nodes clk1-tn- . . . -t3-t2-t1-tsk1-master and clk2-sk1 -sk2-tnm- . . . -t3m-t2m-t1m-tsk2-tsk1-master.

Figure 5:
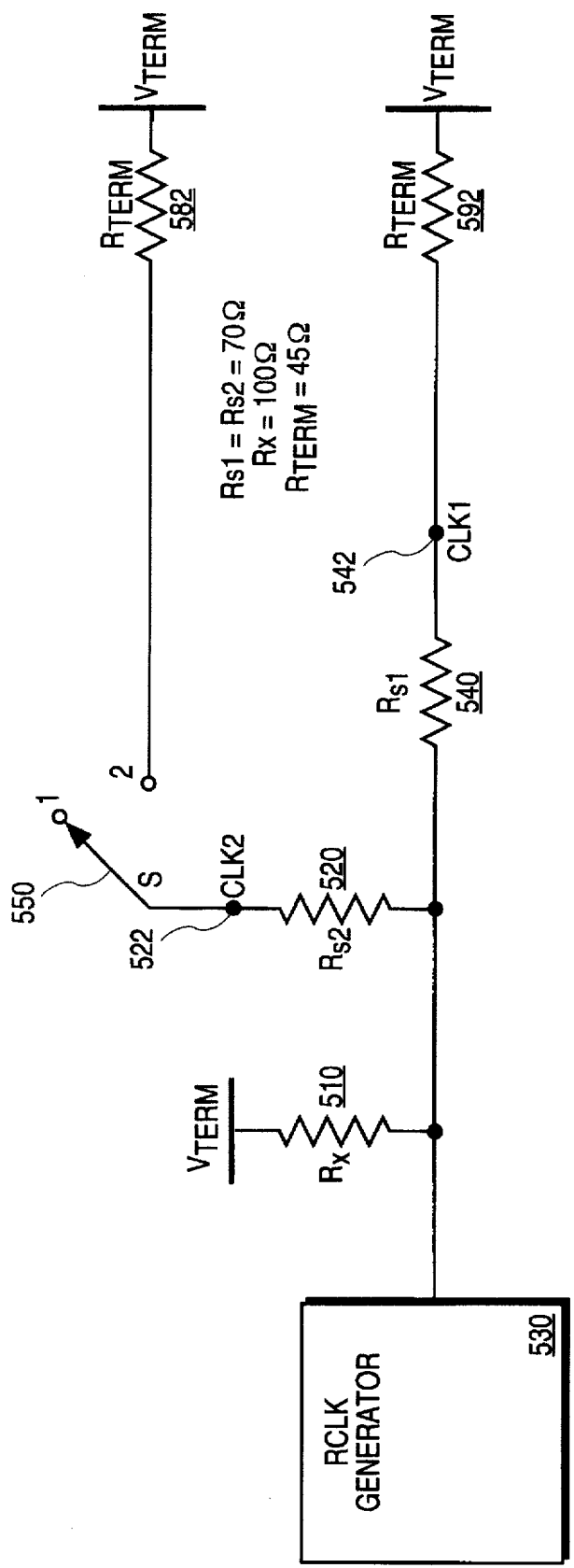
FIG. 5 illustrates the D.C. model of the clock net.

FIG. 5 illustrates a D.C. model of the clock net. Resistors $R_{s1}$ (540), $R_{s2}$ (520), and $R_x$ (510) form the clock signal splitter. $R_{s1}$, $R_{s2}$, and $R_x$ are chosen to generate the desired signal swing and symmetrical rise and fall times for the clock signal. These resistors ensure that the clock signal has the correct voltage swing on the bus whether or not the module is present. Switch 550 represents the presence or the absence of the module. Pull-up resistor $R_x$ may not be necessary, however, $R_x$ helps improve the clock rise time in the presence of pin capacitance from clock generator 530. Resistor $R_{s2}$ should be located as close as possible to clock generator 530 and the socket. This is because the trace joining $R_{s2}$ to the motherboard and module clock nets acts as a stub when the module is not plugged in.

Without a module present, the clock signal levels at node 542 are as follows:

clock high level, $V_{OH} = V_{term}$, clock low level, $V_{OL} = V_{term} * \dfrac{R_{s1} + r_{on}}{R_{s1} + r_{on} + R_{term}}$, where $r_{on}$ is the output driver on-resistance of clock generator 530.

Assuming that the voltage at node 542 is the same as the voltage at node 522 with the module present, the clock signal levels are as follows:

clock high level, $V_{OH} = V_{term}$, clock low level, $V_{OL} = V_{term} * \dfrac{(R_{s1}\|R_{s2}) + r_{on}}{(R_{s1}\|R_{s2}) + r_{on} + R_{term}/2}$, where $r_{on}$ represents the clock generator output driver resistance.

The assumption that the voltage at node 542 equals the voltage at node 522 implies that $R_{s1}=R_{s2}$ because terminators 582 and 592 have the same value ($R_{term}$). $R_x$ is chosen to be substantially larger than $r_{on}$ such that $R_x$ should have a relatively small effect on the clock signal levels, therefore $R_x$ has been ignored in the above equations. A relatively large value for $R_x$ also has an added advantage from an a.c. analysis viewpoint. From an a.c. analysis viewpoint, $R_x$ and ron will be in parallel. If $R_x \gg r_{on}$, then $R_x$ will have negligible effect on the effective clock generator output driver on resistance which will still be approximately $r_{on}$.

$R_{term}$ is chosen to be 45 ohms. If Rterm exceeds the characteristic impedance of the bus, $Z_o$, negative current reflections could result. To this point nominal resistance values have been selected without regard to manufacturing tolerances. Theoretically $R_{term}$ should be a 50 ohm resistor in order to match the characteristic impedance of the bus. However, in practice any value chosen is actually a nominal value plus or minus some tolerance value. For example, the 50 ohm characteristic impedance assumed for the bus might be 50 ohms with a 10% tolerance (i.e., 50 Ω±10%). This means the actual characteristic impedance could be anywhere in the range of 45 to 55 ohms. Even if $R_{term}$ has a 1% tolerance, a resistance of 50 Ω±1% is just as likely to exceed $Z_o$ as to not exceed $Z_o$. In this embodiment, a nominal mismatch (i.e., 45 Ω vs. 50 Ω) is preferable to a nominal match that might result in $R_{term}$ exceeding the characteristic impedance of the bus due to manufacturing tolerances. Thus to ensure that negative current reflections do not result, $R_{term}$ is chosen to have a nominal value of 45 Ω.

A typical value for ron might be 5 to 10 ohms. A value of 100 Ω is chosen for $R_x$ to ensure negligible effects on the clock signal levels. $V_{term}$ in one embodiment is approximately 2.5 volts. Generally, the greater the difference between $V_{OH}$ and $V_{OL}$, the less sensitive the system will be to noise on the clock net. In other words, increasing $|V_{OH}-V_{OL}|$ provides a greater noise margin. In this embodiment, $|V_{OH}-V_{OL}|$ is chosen to be 1.0 volt. Therefore, $V_{OL}$ must be $V_{term}$ −1.0 volt, or 1.5 volts. According to the above equations, $R_{s1}$ should be approximately 70 ohms for a $V_{OL}$ of 1.5 volts when the module is not present.

When the module is present, switch 550 would be in position 2. Because of the assumption that $R_{s1}=R_{s2}$, $R_{s2}$ must also be 70 ohms. Thus nodes 522 and 542 will each have a $V_{OL}$ of 1.5 volts. As previously stated, the trace joining $R_{s2}$ to the motherboard and module clock nets acts as a stub when the module is not plugged in. In order to minimize reflections due to this stub when the module is not present, the clock generator should be placed close to the socket contacts on the motherboard. Adhering to the general rule of thumb that the electrical length of the stub should be less than one-eighth of the clock signal transition time (300 picoseconds) suggests a physical length of no more than 5 mm between $R_{s2}$ and the socket.

The lengths of the segments of the clock and data nets should adhere to three rules: 1) equal clock signal arrival times across the socket, (2) equal clock signal and data signal arrival times on the motherboard, and (3) simultaneous arrival of the module data signal to the motherboard and the motherboard clock signal.

Referring to FIG. 1, in order to achieve equal clock signal arrival times across the socket, the clock signal must arrive at nodes tsk2 and tsk1 simultaneously. This requires that the electrical length of path clk-clk1-tsk1 be equal to the electrical length of path clk-clk2-tsk2. In addition, the electrical length defined by clk-ckl1-tsk1-rsk1 must be identical to the electrical length of path clk-clk2-ts2-rsk2. This implies that the electrical length of path tsk1-rsk1 is the same as the electrical length of path tsk2-rsk2.

The second rule mandates that the clock and data signals arrive at the same time on the motherboard. This requirement helps to eliminate signal skewing. This rule requires the electrical length of rsk1-rj=electrical length of tsk1-tj= electrical length dsk1-dj where j={1, 2, 3, . . . n}.

The third rule requires the electrical length of rsk2-rjm= electrical length of tsk2-tjm=dsk1-djm, where j={1, 2, 3, . . . n}.

Because the clock and data nets have similar loads on them, equal electrical lengths generally implies equal physical lengths between corresponding segments of the motherboard clock and data nets and between corresponding segments of the module clock and data nets. Exceptions to this rule include (1) unloaded trace segments (e.g., clk1-tn, tsk2-rsk2); and (2) socket segments (e.g., sk1-sk2, rsk1-rsk2); and (3) the master ASIC (e.g., tsk1-master-rsk1 has no corresponding segment on the motherboard data net).

Table 1 contains a list of dimensions for various data net segments for a bus having four slaves (n=4). The distance between the data 5 connections for the slaves is determined by the width of the slave devices. In this embodiment, the slaves have a package width of 12.5 mm. These values are meant to be used as an example of the relative lengths of the various segments as opposed to absolute lengths of the segments. In other words, manufacturing and packaging technologies might permit improvements on minimum achievable lengths, but the relationships between dependent segments should remain about the same.

TABLE 1

Data Net Segment Lengths

| Motherboard | Length (mm) | Module | Length (mm) |
|---|---|---|---|
| master-dsk1 | 4 | | |
| dsk1-d1 | 8 | dsk2-d1m | 5.2 |
| d1-d2 | 13 | d1m-d2m | 13 |
| d2-d3 | 13 | d2m-d3m | 13 |
| d3-d4 | 13 | d3m-d4m | 13 |
| d4-terminator | 10 | d4m-terminator | 10 |

One skilled in the art can determine the lengths of the appropriate segments of the clock and data nets as follows. Given lengths for the segments clk-sk1, tsk1-rsk1, sk1-sk2 (socket length), sk2-tn (clock trace on the module), and d1m-dsk2 (distance of slave 1 m from the socket), the required lengths of clk1-tn, t1m-tsk2, tsk2-rsk2, and rsk2-r1m can be determined from rules 1 through 3 above. Table 2 contains a list of dimensions for various clock net segments derived from rules 1 through 3 and Table 1. As with Table 1, these lengths should be used for purposes of showing the relationships between the lengths of different segments.

TABLE 2

Clock Net Segment Lengths

| Motherboard | Length (mm) | Module | Length (mm) |
|---|---|---|---|
| clk-clk1 | 1 | | |
| clk-clk2 | 1 | | |
| clk1-t4 | 116.7 | sk2-t4m | 55 |
| t4-t3 | 13 | t4m-t3m | 13 |
| t3-t2 | 13 | t3m-t2m | 13 |
| t2-t1 | 13 | t2m-t1m | 13 |
| t1-tsk1 | 8 | t1m-tsk2 | 5.2 |
| tsk1-master | 4 | tsk2-rsk2 | 71 |
| master-rsk1 | 4 | | |
| rsk1-r1 | 13 | rsk2-r1m | 5.2 |
| r1-r2 | 13 | r1m-r2m | 13 |
| r3-r4 | 13 | r3m-r4m | 13 |
| r4-terminator | 10 | r4m-terminator | 10 |

Dual Channel Bus

Figure 6:
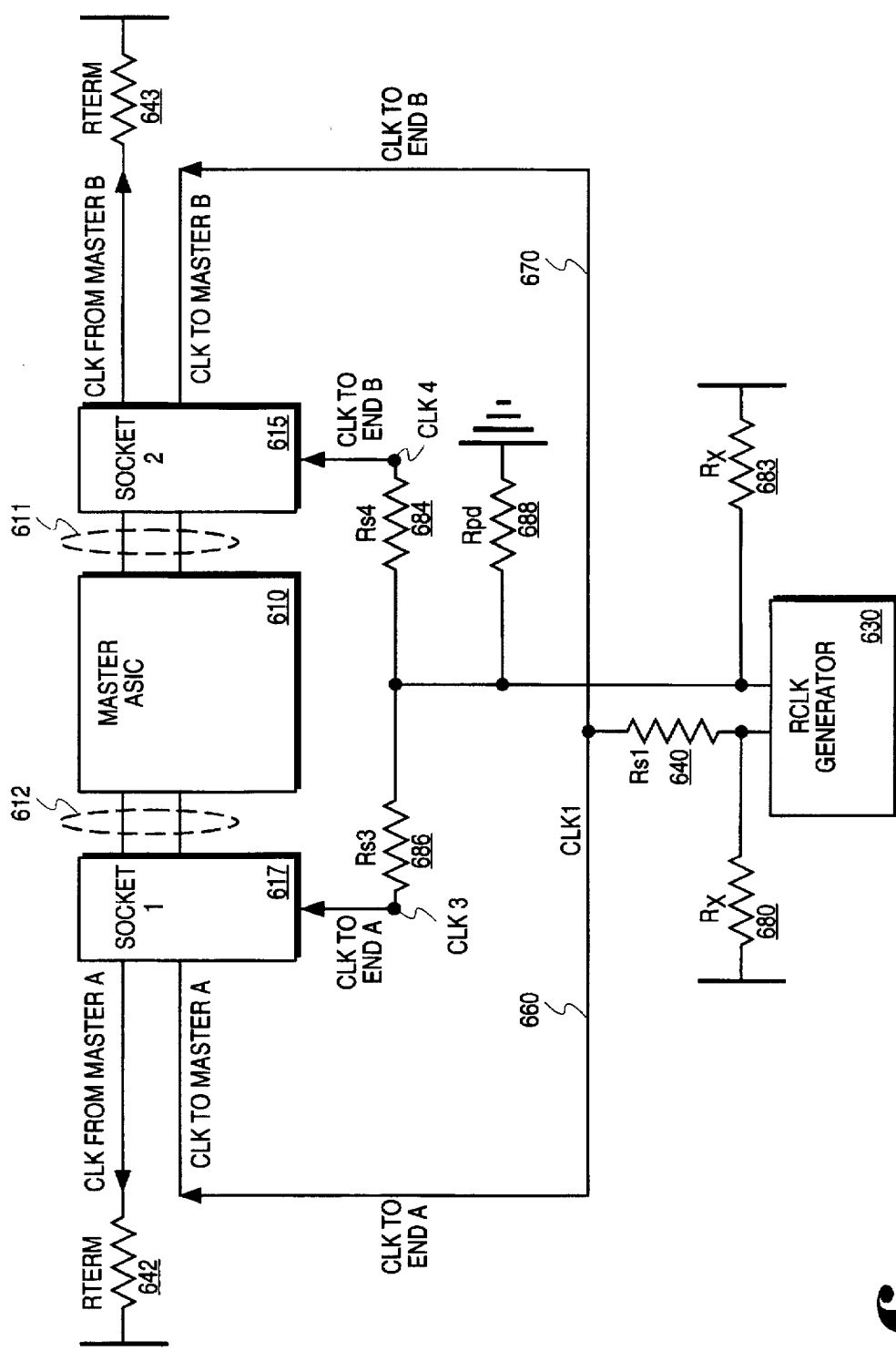
FIG. 6 illustrates the clock net topology for the bus using a dual channel master ASIC.

FIG. 1 illustrated clock net and data net circuitry for a single channel memory controller. FIG. 6 illustrates one embodiment of clock net circuitry for dual channel memory controller ASIC 610. An expansion module can be added to first channel 612 by plugging it into socket 617. An expansion module can be added to second channel 611 by plugging it into socket 615. This embodiment is designed such that the first expansion module is plugged into socket 617 and any subsequent module is plugged into socket 615. The two motherboard clock nets and any module clock nets are driven by two different outputs from clock generator 630. One clock generator output driver provides the clock signal for each clock net (660, 670) on the motherboard. The other clock generator output driver provides the clock signals to one or more modules plugged into sockets 615 and 617.

In this embodiment, clock generator 630 is located near socket 615 to ensure minimal reflections from socket 615 when socket 615 is empty. When no module is present in either socket (i.e., both 615 and 617 empty) the output of the clock driver used for the modules is pulled to signal ground by resistor 688 ($R_{pd}$). $R_{pd}$ is chosen to have a value at least 20 times $R_{term}$ to ensure that $R_{pd}$ has negligible effect as compared to resistors 684 ($R_{s3}$) and 686 ($R_{s4}$) when modules are plugged into sockets 615 and 617. Resistors $R_{s3}$ and $R_{s4}$ are chosen such that when modules are plugged into both 615 and 617, the clock signal levels at nodes clk3 and clk4 have the proper voltage swing as described for the single channel design illustrated in FIG. 5. Since $R_{pd}$ is negligible, this means each of $R_{s3}$ and $R_{s4}$ will have a value of approximately 70 ohms in this embodiment.

Resistors 520 and 540 in FIG. 5 have been replaced with single resistor 640 ($R_{s1}$). In FIG. 5 the clock signal splitter circuitry had to account for the presence or absence of the module. In FIG. 6, the clock signal from resistor $R_{s1}$ drives only the motherboard. The motherboard will always be fully populated so resistors 520 and 540 of FIG. 5 can be replaced with single resistor $R_{s1}$ in FIG. 6. Rs1 should have the equivalent value of resistors 520 and 540 in parallel, or about 35 ohms. In this embodiment, terminating resistors 642 and 643 have a nominal value of 45 ohms.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A bus for communicating signals with a removable module, the bus comprising:

a singly terminated motherboard net for communicating signals between a master and one or more motherboard devices;

a socket for communicating the signals between the motherboard net and a singly terminated module net of the removable module, the module net communicating the signals between the master and one or more module devices, wherein the motherboard and module nets are coupled to form a doubly terminated net when the module is present.

2. The bus of claim 1 wherein a signal swing and a level of reflection of the signals are substantially independent of the presence of the module.

3. The bus of claim 1 wherein at least one of the motherboard devices and the module devices is a memory device.

4. The bus of claim 3 wherein the memory device is a dynamic random access memory.

5. The bus of claim 1 wherein at least one of the motherboard devices and the module devices is a slave device having a programmable current control.

6. The bus of claim 1 wherein the motherboard net comprises a motherboard data net, wherein the module net comprises a module data net, wherein the motherboard data net and the module data net are coupled to form a doubly terminated data net when the module is present.

7. The bus of claim 1 wherein the motherboard net comprises a motherboard clock net for communicating a first clock signal, wherein the module net comprises a module clock net, wherein the motherboard clock net and the module clock net are coupled to form a doubly terminated clock net when the module is present.

8. The bus of claim 7 further comprising:
clock circuitry for providing the first clock signal and a second clock signal, the socket communicating at least one of the first and second clock signals to the module clock net.

9. The bus of claim 8 wherein the second clock signal is communicated to a non-terminated end of the module clock net, wherein the socket couples a module clock net transmit node to a motherboard clock net transmit node, wherein the socket couples a module clock net receive node to a motherboard clock net receive node.

10. The bus of claim 9 wherein the module clock net includes a module clock net loop, wherein an electrical length of a first path from the module clock net transmit node through the module clock net loop to the module clock net receive node is substantially the same as an electrical length of a second path from the module clock net transmit node to the motherboard clock net transmit node to the master to the motherboard clock net receive node to the module clock net receive node.

11. The bus of claim 9 wherein the module clock net does not include a clock net loop.

12. The bus of claim 8 wherein the second clock signal is communicated to a non-terminated end of the module clock net, wherein the first clock signal is not communicated to the module clock net.

13. The bus of claim 8 wherein a terminating resistance of the module clock net and the motherboard clock net is in a range of 45 to 55 ohms.

14. The bus of claim 8 wherein the clock circuitry comprises:
a clock signal splitter for providing the first clock signal and a second clock signal from a source clock signal, wherein the clock signal splitter further comprises:
a first resistor;
a second resistor, a first end of the first resistor and a first end of the second resistor forming a node for receiving the source clock signal, wherein the first clock signal is provided at a second end of the first resistor and the second clock signal is provided at a second end of the second resistor.

15. The bus of claim 14 wherein the first and second resistors have substantially the same resistance.

16. The bus of claim 15 wherein the first and second resistors have a resistance of approximately 70 ohms.

17. The bus of claim 14 wherein the dock signal splicer further comprises a third resistor coupled to the node and a voltage potential, wherein a symmetry of the source clock signal varies in response to a resistance of the third resistor.

18. A bus for communicating signals with a removable module, the bus comprising:
a singly terminated motherboard data net for communicating data signals between a master and one or more motherboard devices;
a singly terminated motherboard clock net for communicating a first clock signal to the master and the one or more motherboard devices;
a socket for communicating the data signals between the motherboard data net and a singly terminated module data net of the removable module, the module data net communicating the data signals between the master and one or more module devices, wherein the socket communicates clock signals from the motherboard clock net to a singly terminated module clock net of the removable module, the module clock net communicating the clock signals from the motherboard clock net to the one or more module devices;
wherein the motherboard and module data nets are coupled to form a doubly terminated data net when the module is present, wherein the motherboard and module clock nets are coupled to form a doubly terminated clock net when the module is present.

19. The bus of claim 18 wherein a data signal swing and a level of reflection of the data signals are substantially independent of the presence of the module.

20. The bus of claim 18 wherein a clock signal swing of the motherboard clock net is substantially independent of the presence of the module.

21. The bus of claim 18 wherein a clock net segment electrical length and a data net segment electrical length between a first motherboard device and any other motherboard device is substantially the same.

22. The bus of claim 18 wherein a clock net segment electrical length and a data net segment electrical length between a first module device and any other module device is substantially the same.

23. The bus of claim 18 wherein a terminating resistance of each of the module clock net, the module data net, the motherboard clock net, and the motherboard data net is in a range of 45 to 55 ohms.

24. The bus of claim 18 wherein at least one of the motherboard devices and the module devices is a memory device.

25. The bus of claim 18 wherein the memory device is a dynamic random access memory.

26. The bus of claim 18 wherein at least one of the motherboard devices and the module devices is a slave device having a programmable current control.

27. A dual channel modular bus for communicating signals with a removable first module and a removable second module, the bus comprising:
a first singly terminated motherboard data net for communicating first data signals between a master and a first set of motherboard devices, the first set comprising one or more motherboard devices;
a second singly terminated motherboard data net for communicating second data signals between the master and a second set of motherboard devices, the second set comprising another one or more motherboard devices;
a first socket for communicating the first data signals between the first motherboard data net and a first singly terminated module data net of the removable first module, wherein the first motherboard data net and the first module data net are coupled to form a first doubly terminated data net when the removable first module is present;
a second socket for communicating the second data signals between the second motherboard data net and a second singly terminated module data net of the removable second module, wherein the second motherboard data net and the second module data net are coupled to form a second doubly terminated data net when the removable second module is present.

28. The dual channel modular bus of claim 27 wherein a data signal swing and a level of reflection of the data signals on the first and second motherboard data nets are substantially independent of the presence of the first and second modules.

29. The dual channel modular bus of claim 27 wherein at least one of the first and second modules includes a module device, wherein at least one of the motherboard devices and the module device is a memory device.

30. The dual channel modular bus of claim 29 wherein the memory device is a dynamic random access memory.

31. A method of adjusting a programmable slave output driver current of a slave coupled to a bus for communicating signals with a master and a removable module, the method comprising the steps of:

(A) setting a register setting of the master to a first value, wherein the bus couples the master to the slave, wherein the bus is doubly terminated when the removable module is coupled to the bus, wherein the bus is singly terminated when the removable module is not coupled to the bus;

(B) communicating the register setting from the master to an output driver of the slave, wherein the slave adjusts a slave current corresponding to the register setting, wherein the slave returns a packet to the master;

(C) comparing a voltage level of the packet to a reference voltage;

(D) if the voltage level is greater than or equal to the reference voltage, then adjusting the register setting to provide for a greater slave current and repeating steps B) through C);

(E) if the voltage level is less than the reference voltage, then:

(1) setting the register setting to a final value, wherein the final value corresponds to twice a level of slave current as the present value;

(2) communicating the register setting from the master to the output driver of the slave.

32. The method of claim 31 wherein the final value is computed by doubling the present value.

* * * * *